Patented Sept. 12, 1933

1,926,511

UNITED STATES PATENT OFFICE 1,926,511

ESTER SOLVENTS AND COMPOSITIONS

Guy H. Buchanan, Westfield, N. J., assignor to American Cyanamid Company, New York, N. Y., a corporation of Maine No Drawing. Application February 25, 1930
Serial No. 431,346

6 Claims. (Cl. 134—79)

This invention relates to solvents, and more particularly to solvents for esters of cellulose and the like, such as cellulose nitrate.

In the preparation of lacquer compositions and the like containing cellulose esters such as cellulose acetate and cellulose nitrate, many solvents have been suggested and used. These solvents vary in boiling point and the drying time of the finished composition is usually regulated by suitable combinations of these solvents.

This application is a continuation in part of my co-pending application, Serial Number 162,306, describing my solvents and their uses.

I have discovered that a certain class of compounds are eminently suitable for use as solvents, particularly in cellulose ester compositions. These solvents may be easily and economically prepared and have boiling points which adapt them to wide use in such arts as the cellulose ester lacquer art and the like.

I have discovered that the alkyl esters of α-hydroxy-iso butyric acid, in which the alkyl radical contains more than two carbon atoms, and preferably 3 to 5, are especially suitable as cellulose ester solvents. This group of substances includes propyl, isopropyl, butyl, amyl, etc. esters of α-hydroxy butyric acid. These substances have the following generic formula

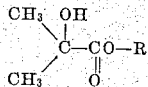

in which R is an alkyl radical containing more than two carbon atoms.

These esters may be prepared by reacting acetone cyanhydrin and other cyanhydrins with the corresponding alcohol in the presence of hydrochloric acid. Thus, to prepare the butyl ester, the cyanhydrin is reacted with butyl alcohol in the presence of the acid, using the amount of water required by the chemical equation. The mixture is heated till the cyanhydrin is completely reacted. The precipitated ammonium chloride is filtered off and may be washed with additional alcohol, the filtrate and washings being combined, and from this combination the ester is separated from the excess alcohol by fractional distillation. The butyl α-hydroxy butyrate has a boiling point of about 182° C.

The acetone cyanhydrin may be prepared by the addition of liquid hydrocyanic acid to substantially anhydrous acetone, using a small amount of alcoholic caustic soda solution as the catalyst. The other α-hydroxy butyric esters may be prepared in a manner similar to that described, the butyrates increasing in boiling point with the increase of carbon atoms in the alkyl radical, the amyl butyrate boiling at about 193° C., and the propyl below 180° C.

All of these esters of α-hydroxy butyric acid are excellent solvents, the change in the alkyl radical having comparatively little effect upon the solvent properties, the only important difference being in the boiling point and rate of evaporation of the esters. It is obvious that methods other than described may be used in preparing my esters without departing from the spirit of the invention. The solvents which I have discovered are suitable for use with the various esters and ethers of cellulose including nitrocellulose, cellulose acetate, natural and synthetic resins, gums, etc. It is to be understood that the invention is susceptible of many variations without departing from the scope thereof except as defined in the claims appended hereto.

I claim:—

1. A composition of matter comprising a cellulose ester and an aliphatic ester of α-hydroxy iso butyric acid in which the alkyl radical contains more than two carbon atoms. The ester being compatible with the cellulose ester.

2. A composition of matter comprising a cellulose nitrate and an aliphatic ester of α-hydroxy iso butyric acid in which the alkyl radical contains more than two carbon atoms, the ester being compatible with the cellulose ester.

3. A composition of matter comprising a cellulose ester and an aliphatic ester of α-hydroxy iso butyric acid in which the alkyl radical contains from three to five carbon atoms.

4. A composition of matter comprising a cellulose nitrate and an aliphatic ester of α-hydroxy iso butyric acid in which the alkyl radical contains from three to five carbon atoms.

5. A composition of matter comprising a cellulose ester and a butyl ester of α-hydroxy iso butyric acid.

6. A composition of matter comprising a cellulose nitrate and a butyl ester of α-hydroxy iso butyric acid.

GUY H. BUCHANAN.